United States Patent [19]
Kreiner et al.

[11] Patent Number: 6,138,451
[45] Date of Patent: Oct. 31, 2000

[54] ROCKET ENGINE WITH COMBUSTION CHAMBER STEP STRUCTURE INSERT, AND ITS FABRICATION

[75] Inventors: Kurt Kreiner, Hawthorne; David Bronson, Manhattan Beach, both of Calif.

[73] Assignee: Hughes Electronics Corporation, Los Angeles, Calif.

[21] Appl. No.: 09/076,033

[22] Filed: May 11, 1998

[51] Int. Cl.[7] .................................. F02K 9/52; F02K 9/62
[52] U.S. Cl. .................... 60/258; 29/890.01; 60/39.32
[58] Field of Search .............................. 60/258, 257, 259, 60/39.32, 39.31; 29/890.01

[56] References Cited

U.S. PATENT DOCUMENTS

| | | | |
|---|---|---|---|
| 2,992,528 | 7/1961 | Ozanich et al. | 60/258 |
| 3,000,184 | 9/1961 | Fish | 60/258 |
| 3,581,495 | 6/1971 | Kah, Jr. | 60/258 |
| 3,851,468 | 12/1974 | Frankle et al. | 60/258 |
| 4,901,526 | 2/1990 | Barth et al. | 60/258 |
| 4,917,968 | 4/1990 | Tuffias et al. . | |
| 4,936,091 | 6/1990 | Schoenman | 60/258 |
| 5,613,299 | 3/1997 | Ring et al. | 29/890.01 |

*Primary Examiner*—Ted Kim
*Attorney, Agent, or Firm*—Terje Gudmestad; Michael W. Sales

[57] ABSTRACT

A rocket engine has a combustion chamber formed of an annular wall made of an annular wall material, and an annular insert made of an annular insert material that is of substantially the same thermal expansion coefficient as the annular wall material. The annular insert has an insert outer surface sized to fit within and contact the wall inner surface along less than the wall length. The annular wall and the annular insert are welded together. There is further an attachment between the combustion chamber and an injector. The attachment includes an annular metallic deposit bonded to the combustion chamber, an annular adaptor ring, a weld joint between the adaptor ring and the metallic deposit, and a joint between the adaptor ring and the injector.

17 Claims, 3 Drawing Sheets

ROCKET ENGINE WITH COMBUSTION CHAMBER STEP STRUCTURE INSERT, AND ITS FABRICATION

BACKGROUND OF THE INVENTION

This invention relates to the structure of a liquid-fueled rocket engine, and, more particularly, to the structure of the combustion chamber and its manufacture, and the joining of the propellant injector and the combustion chamber.

A typical liquid-fueled rocket engine includes a cylindrically symmetric combustion chamber, with an injector attached to its injector end and a flared nozzle attached to its nozzle end. A liquid propellant including fuel and an oxidizer flows through injector ports in the injector and into the combustion chamber. The propellant is ignited in the combustion chamber. The hot gas resulting from the combustion expands through the nozzle and drives the rocket engine and the attached rocket structure in the direction opposite to that in which the nozzle is pointed.

The combustion chamber is generally cylindrical, but it is known to provide an outward step in the inner wall of the combustion chamber. That is, near the injector the inner surface of the wall of the combustion chamber has a first diameter, but at a location a portion of the distance from the injector to the nozzle there is an abrupt outward step in the inner surface of the wall to a second, greater diameter. The presence of this step promotes improved mixing and combustion of the fuel and the oxidizer, leading to improved performance of the rocket engine.

The wall of the combustion chamber is exposed to high temperature combustion gas during service. The wall is preferably made of a refractory material such as rhenium coated with iridium on the inwardly facing surface. The injector plate is much cooler, and is typically made of titanium. When the rocket engine is fired, there is a large temperature increase from ambient temperature and a large temperature gradient between the upper end of the combustion chamber and the adjacent injector, through the region where the two are attached.

It is conventional practice to attach the injector plate to the combustion chamber with a flange-and-bolt system or by welding. The flange-and-bolt system as the disadvantage that the mechanical seal is not well suited to withstand, without leaking, the high temperatures, large temperature change between ambient temperature and the service temperature, and large temperature gradients experienced during service. Welding of the extremely dissimilar metals is difficult, and in particular it is quite difficult to achieve reliable welds of rhenium to titanium with available welding technology. The high temperatures on the combustion chamber side of the joint and the high temperature gradient through the joint can lead to a premature failure of the joint and a shortening of the life of the engine. Even a small pinhole in the joint can be disastrous, as it results in a back leak of hot combustion gases from the interior of the combustion chamber.

Recent advances in the design of the rocket engine to allow higher-temperature combustion and the use of more powerful propellants have resulted in even greater temperatures and temperature gradients. The existing stepped combustion chamber and combustion chamber/injector structures may be insufficient for operation in this environment. There is therefore a need for an improved approach to the manufacturing and structure of the combustion chamber, and for the attachment of the injector to the combustion chamber. The present invention fulfills this need, and further provides related advantages.

SUMMARY OF THE INVENTION

The present invention provides a rocket engine with an improved stepped combustion chamber structure and an approach for its manufacture. Also provided is an improved attachment between the injector and the combustion chamber. The rocket engine may be operated reliably at higher temperatures than possible with prior attachment procedures. Damage resulting from differences in the thermal expansion coefficients of elements of the structure of the rocket engine is minimized.

In accordance with the invention, a rocket engine comprises a combustion chamber incorporating an annular wall with a wall inner surface and a wall outer surface. The annular wall has a wall length and is made of an annular wall material. An annular insert is made of an annular insert material that is of substantially the same thermal expansion coefficient as the annular wall material. the annular insert has an annular insert outer surface sized to fit within and contact the wall inner surface, in a faying relationship along less than the entire wall length. A first weld joint is made between the annular wall and the annular insert. The rocket engine further includes an injector. An attachment between the combustion chamber and the injector comprises an annular metallic deposit bonded to the combustion chamber, an annular adaptor ring, a second weld joint between the adaptor ring and the metallic deposit, and a third weld joint between the adaptor ring and the injector.

The combustion chamber is formed as two pieces of material, the annular wall and the annular insert that slides into the annular wall and is welded to the wall inner surface. The two pieces are preferably made of the same material, or may be made of different materials if their coefficients of linear thermal expansion are substantially the same. The use of materials with the same or about the same coefficients of thermal expansion ensures that differential thermal expansion will not result in a separation of the two pieces or damage to the wall by expansion of the annular insert during service. The geometry of the present construction is relatively easy to manufacture, inasmuch as both the wall inner surface and the annular insert outer surface are cylindrical.

The present combustion chamber wall and insert may be manufactured by any operable technique, but chemical vapor deposition, plasma spraying, explosive forming, sputtering, grinding, and electrical discharge machining (EDM) are preferred approaches. In a preferred construction, the chamber wall is made of rhenium. At least a portion of the chamber wall inner surface and/or the portion of the annular insert facing the combustion gas may be coated with a layer of a material that provides enhanced resistance to the highly corrosive and erosive combustion gases. Such a coating material may be, for example, iridium or a ceramic. The coating may be applied before or after the wall and annular insert are assembled and welded together. If the coating is applied before the pieces are assembled, care is taken not to apply the coating to the faying surfaces.

The combustion chamber is joined to the injector by the attachment. The attachment preferably includes the annular metallic deposit bonded to the first axial region of the combustion chamber, the annular adaptor ring, a weld between the adaptor ring and the metallic deposit, and a weld or other type of joint between the adaptor ring and the injector. The metallic deposit is preferably made of columbium, which is also known as niobium. (As used herein, a metal identified generically includes both the unalloyed metal and its alloys containing at least about 50 percent by weight of the pure metal. Thus, for example, as used herein unless otherwise stated, "columbium" includes both unalloyed columbium and its alloys.) The metallic deposit is bonded to the combustion chamber wall by any operable technique, such as chemical vapor deposition, inertial welding, explosive cladding, or plasma spraying. Once this metallic deposit is in place, the annular adaptor ring is welded to the metallic deposit at one end, and to the injector at the other. The axial location of the combustion chamber is established, in part, by the length of the adaptor ring, which allows the combustion chamber to be positioned for optimal performance. This axial positioning of the combustion chamber also allows the location of the bond joint between the metallic deposit and the combustion chamber to be positioned so as to maximize its performance, which typically is associated with minimizing differential thermal expansion and shock effects at the joint.

The present invention thus provides a rocket engine which has good efficiency of operation and specific impulse due to the presence of the internal step within the combustion chamber. It also has good reliability because of the construction of the combustion chamber, and the ability to position the bond between the metallic deposit and the combustion chamber at an optimal axial location. The rocket engine is readily manufactured by available techniques. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
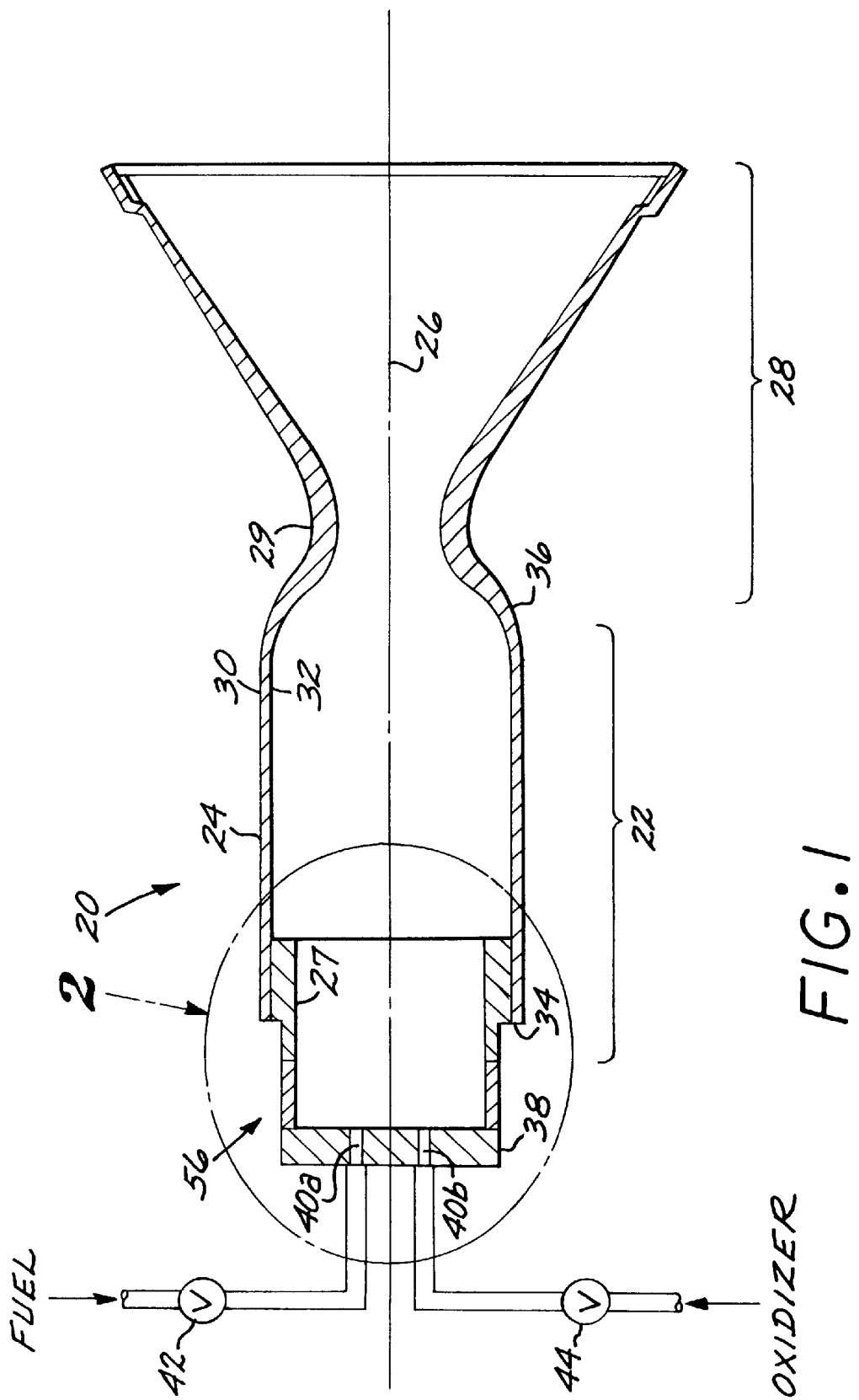
FIG. 1 is a sectional view of a rocket engine.
Figure 2:
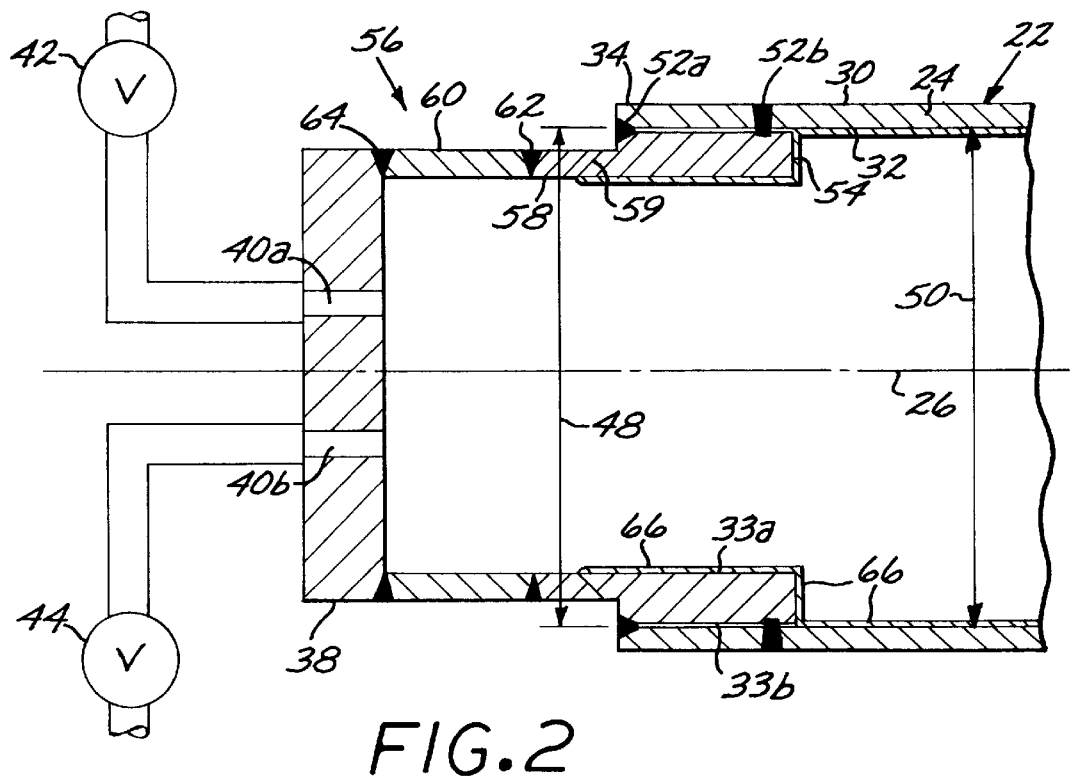
FIG. 2 is an enlarged detail of FIG. 1 in region 2—2, showing the injector and injector end of the combustion chamber.
Figure 3:
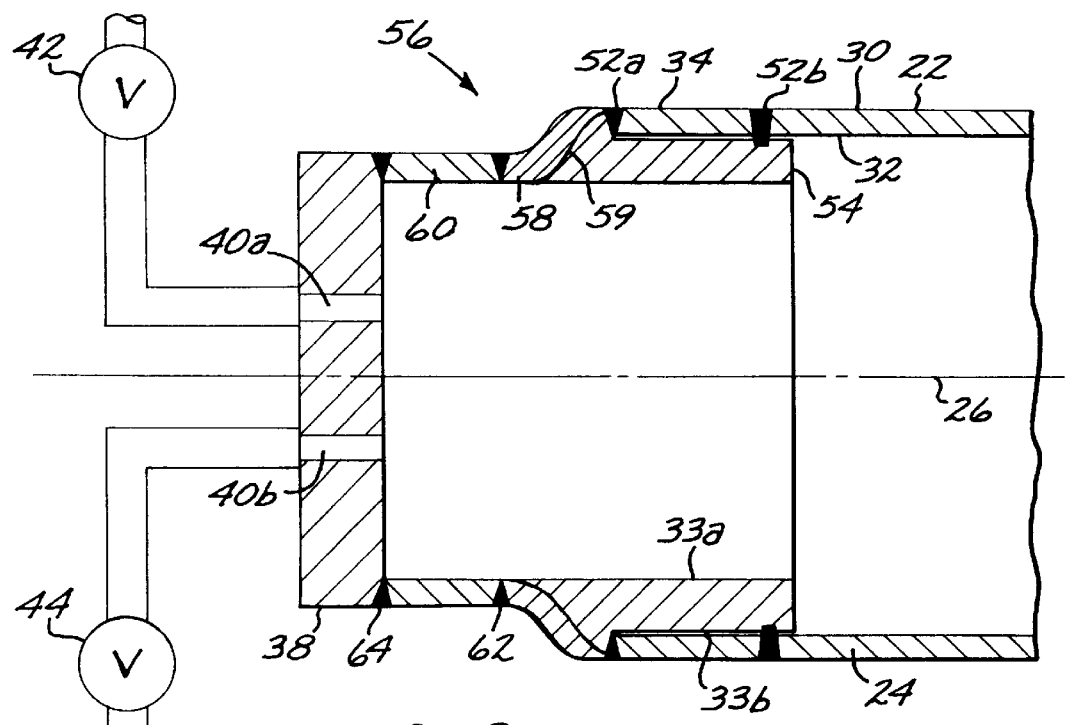
FIG. 3 is a second embodiment of the enlarged detail of FIG. 2.

FIG. 1 depicts a rocket engine 20, and FIGS. 2–3 show details of the rocket engine. The rocket engine 20 includes a combustion chamber 22 having a generally cylindrically symmetric annular wall 24 with a cylindrical axis 26, an insert 27, and an expansion nozzle 28. A narrowed throat region 29 is present within the expansion nozzle 28. The wall 24 and the expansion nozzle 28 may be fabricated separately and joined together, or they may instead be formed integrally. The cylindrical wall 24 has an outer surface 30 and an inner surface 32, and the insert 27 has an outer surface 33a and an inner surface 33b. During service, a portion of the inner surface 32 and the inner surface 33b face the hot combustion gas. The combustion chamber 22 has an injector end 34 and a nozzle end 36.

An injector 38 is attached to the injector end 34 of the combustion chamber 22. The injector 38 may be of any operable design, but is typically a plate having a plurality of injector ports 40 therein, of which only two are shown in FIG. 1. The propellant is provided to the combustion chamber 22 through the injector ports 40. Some of the injector ports 40a are supplied with a fuel through a fuel valve 42, and others of the injector ports 40b are supplied with an oxidizer through an oxidizer valve 44. The fuel and oxidizer flow through their respective injector ports 40 into the interior of the combustion chamber 22 and mix together. Where the mixture is hypergolic, as in the case of the preferred monomethyl hydrazine (fuel) and nitrogen tetraoxide/3 percent nitric oxide (oxidizer), the mixture ignites spontaneously. In other cases where the mixture does not spontaneously ignite, an ignitor (not shown) would be provided. The gaseous combustion products of the combustion expand rearwardly and outwardly through the nozzle 28 and drive the rocket engine 20, and the spacecraft to which it is attached, in the opposite direction.

As illustrated in FIG. 2, the insert 27 has an insert outer diameter 48. The wall 24 of the combustion chamber 22 has a chamber wall inner diameter 50. An abrupt, outwardly extending step transition 54 is defined by the termination of the insert 27 at its end most remote from the injector 38. The step transition 54 promotes thorough mixing and combustion of the fuel and the oxidizer introduced into the combustion chamber 22 through the injector 38.

The insert 27 is joined to the wall 24 by at least one weld joint 52. In FIGS. 2 and 3, two weld joints 52a and 52b are used, with the positioning of the weld joint made to mechanically fix the insert 27 in place and also to provide a gas seal against the leakage of combustion gas from the interior of the combustion chamber 22.

Preferably, the wall 24 of the combustion chamber 22 and the insert 27 are made of the same material, so that they have the same coefficient of thermal expansion. That the wall 24 and the insert 27 have the same, or substantially the same, coefficient of thermal expansion is highly desirable. If the insert 27 were to have a significantly greater coefficient of thermal expansion than the wall 24, the greater expansion of the insert 27 during heating would tend to cause the wall 24 to crack. If the insert 27 were to have a significantly smaller coefficient of thermal expansion than the wall 24, the chamber wall 24 would expand to a significantly greater diameter than that of the outer diameter of the insert 27, placing the joint between the two in tension with an increased likelihood of failure. To achieve acceptable differential thermal expansion properties, the coefficient of thermal expansion of the chamber wall 24 and the insert 27 should be the same or substantially the same. As used herein in relation to coefficient of thermal expansion, "substantially the same" means that the difference in the coefficients of thermal expansion should be no greater than about $0.3 \times 10^{-6}$ inches/inch-° C. when measured at 2000° C.

An attachment 56 joins the combustion chamber 22 to the injector 38. The attachment 48 includes several elements and several joints. The attachment 56 must mechanically join the combustion chamber 22 and the injector 38 to bear the loads imposed during handling and service, during the large temperature changes and gradients which are experienced during service, and also provide a seal against the leakage of hot gas at the injector end 34 of the combustion chamber 22.

The attachment 56 includes an annular metallic deposit 58 bonded in a metal-to-metal contact 59 to the insert 27 of the combustion chamber 22, preferably at the end of the insert 27 nearest the injector 38. (Equivalently for the present purposes, the metallic deposit 58 may be bonded to the wall 24.) The metallic deposit 58 is preferably about 0.110 inch thick (in the radial direction perpendicular to the cylindrical axis 26) at its thickest location. The metallic deposit 58 is positioned as necessary so as not to interfere with welded joints such as weld joint 52a in FIG. 2.

The attachment 56 further includes an annular adaptor ring 60 joined to the metallic deposit 58 by a joint 62, which is most preferably a welded joint. The length of the adaptor ring 60 in the axial direction parallel to the axis 26 may be selected to position the metal-to-metal contact 59 of the metallic deposit 58 to the combustion chamber 22 at any desired location. FIG. 2 illustrates a relatively shorter adaptor ring 60 that positions the contact 59 closer to the injector 38, and FIG. 3 illustrates a relatively longer adaptor ring 60 that positions the contact 59 further from the injector 38. The axial location of the contact 59 may be important to the proper functioning of the engine 20, because the contact 59 is typically between dissimilar metals with different coefficients of thermal expansion, as will be described subsequently. The region of this contact 59 is therefore potentially susceptible to damage during testing and service due to differential thermal expansion and thermal shock effects. The use of the adaptor ring 60 of selectable length allows the designer of the engine to position the region of the contact 59 at an axial location where the potential damage to the engine will be minimal. Once the position of the contact 59 is established in this manner, the axial position of the step transition 54 is determined according to the length of the first axial region 24a. The exact positions of the contact 59 and the step transition 54 are selected according to the nature of the materials used to form the engine. the type of engine, the size of the engine, and the mission of the engine. The selection of these positions is not a part of the present invention, which instead provides engine designers the capability to establish the locations of the key elements of the engine.

The opposite end of the adaptor ring 60 is joined by a joint 64 to the injector 38. The joint 64 may be of any operable type. FIG. 2 illustrates a preferred embodiment wherein the joint 64 is a weld joint, but other types of joints much as a bolted joint may instead be used.

In a preferred embodiment, the wall 24 of the combustion chamber 22 is made of rhenium, most preferably unalloyed rhenium, with an optional 0.003–0.005 inch thick coating 66 on at least a portion of the wall inner surface 32 and/or the insert inner surface 33b. FIG. 2 illustrates an embodiment where the coating 66 is present, and FIG. 3 illustrates an embodiment where no coating is present. The coating 66 is a material which withstands the erosion and corrosion of the hot combustion gas of the engine during service more effectively than does the material of the wall 24. Preferably, the coating 66, where used, is iridium or a ceramic. The coating 66 is applied by any operable technique for the selected coating material. For the preferred iridium coating, the coating 66 is preferably applied by plasma spraying, sputtering, or chemical vapor deposition. Areas that are not to be coated are masked during the coating operation. The annular insert 27 is also preferably made of rhenium, most preferably unalloyed rhenium. It may instead be made of an alloy of 50 weight percent rhenium, 50 weight percent molybdenum, which has a coefficient of thermal expansion at 2000° C. about $0.26 \times 10^{-6}$ inch/inch-° C. greater than that of rhenium.

The metallic deposit 58 is preferably made of unalloyed columbium or C103 alloy having a composition of 10 weight percent hafnium, 1 weight percent titanium, balance columbium. The adaptor ring 60 is preferably made of columbium, most preferably C103 alloy. The injector 38 is preferably made of titanium, most preferably an alloy of 6 weight percent aluminum, 4 weight percent vanadium, balance titanium. The titanium/columbium weld 64 between the injector 38 and the adaptor ring 60, and the columbium/columbium weld 62 between the adaptor ring 60 and the metallic deposit 58, are both readily accomplished by electron beam welding. Alternatively, the joint 64 may be another type of joint such as a bolted joint.

The metallic deposit 58 is present to join the adaptor ring 60 to the wall 24 of the combustion chamber 22. The columbium adaptor ring 60 does not readily braze or weld directly to the relatively thin rhenium wall 24 of the combustion chamber 22 with the required strength and soundness. The metallic deposit 58 is first deposited onto the combustion chamber 22, in this case the insert 27, with a metallurgical bond, and then the adaptor ring 60 is welded to the deposit 58.

Figure 4:
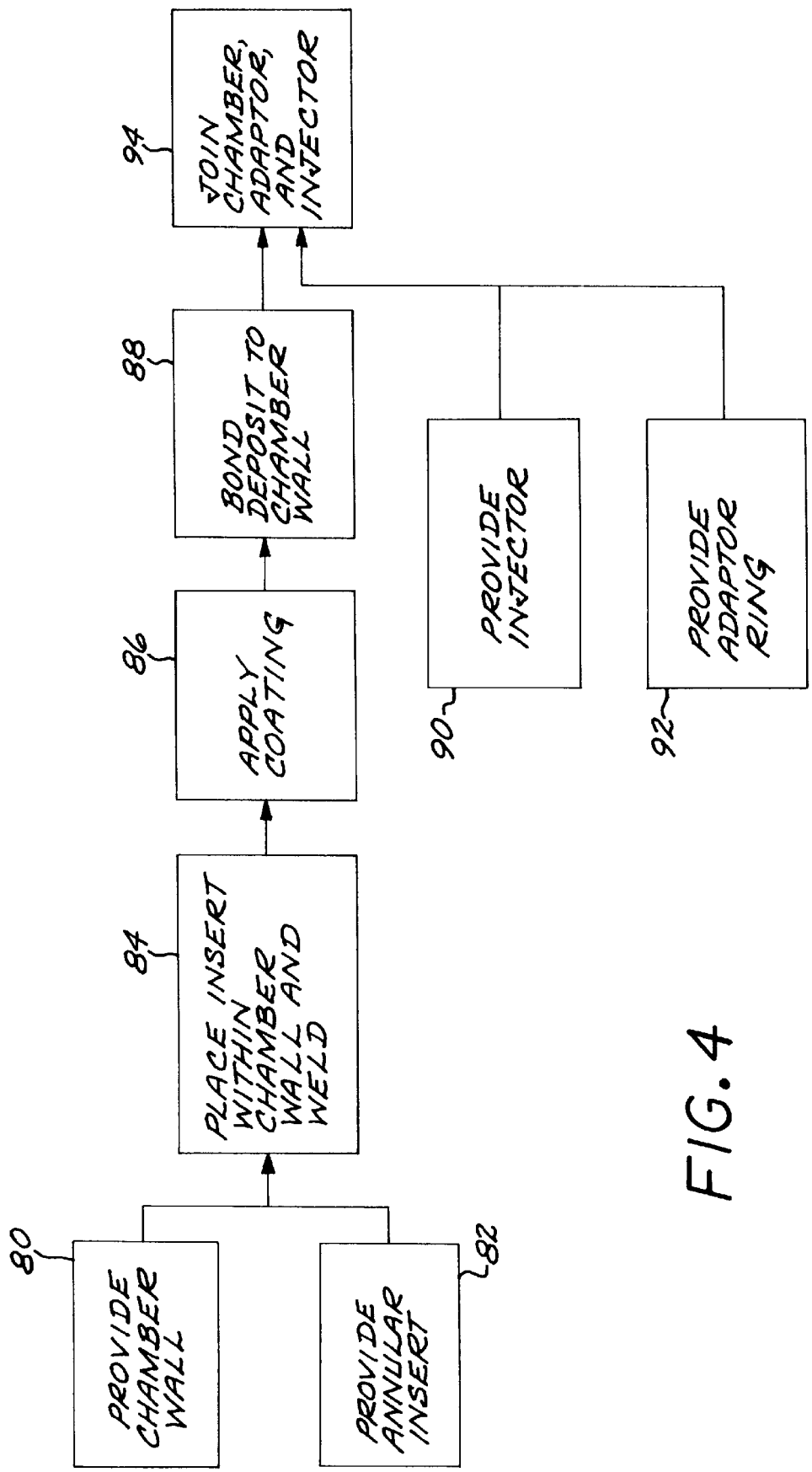
FIG. 4 is a block flow diagram of a method for constructing the rocket engine.

FIG. 4 illustrates the preferred approach to the fabrication of the rocket engine 20. The combustion chamber wall 24 is fabricated and provided, numeral 80. The insert 27 is fabricated and provided, numeral 82. The wall 24 and the insert 27 may be fabricated by any operable technique. The most preferred fabrication technique for each is chemical vapor deposition of the material of construction, such as rhenium, onto a form defining the shape of the article to be fabricated. Alternative operable techniques include, but are not limited to, plasma spraying, explosive forming, and sputtering. The wall 24 and/or the insert 27 may be wrought material, but particular care must be taken that wrought material is not subjected to excessive cold work which could potentially lead to brittleness in the material. All of these techniques are known in the art for other applications.

The insert 27 is positioned axially within the chamber wall 24 and welded in place at the welded joint(s) 52 (such as 52a and 52b), numeral 84. The insert 27 may be made so as to slide along the length of the chamber wall 24 to any desired position, as shown in FIG. 2, or it may be provided with a shoulder near one end so that the axial position is precisely determined, as in FIG. 3.

The coating 66 is applied, numeral 86, if any such coating is to be used. The coating step 86 is depicted in FIG. 4 as occurring after assembly and welding of the insert 27 and the wall 24, step 84. Alternatively, the coating step 86 may be accomplished prior to assembly and welding, step 84. In that event, care is taken that the coating is deposited only on the surfaces that will face the hot combustion gas during service, and not on the faying surfaces that face each other when the insert 27 is welded to the wall 24.

The material of the metallic deposit 58 is provided and bonded to the wall 24 of the combustion chamber 22, numeral 88, to form the metal-to-metal contact 59. Any operable bonding technique may be used. Welding and brazing are preferably not used, because it is difficult obtain a sound bond and contact to rhenium by these techniques. Instead, the preferred technique is to deposit the metallic deposit 58 onto the wall 24, thereby establishing the metal-to-metal bond. The preferred deposition technique is chemical vapor deposition. Other operable techniques include, but are not limited, to, inertial welding, explosive cladding, and plasma spraying.

The injector 38 is provided, numeral 90, and the adaptor ring 60 is provided, numeral 92. The components are joined together, numeral 94. The adaptor ring 60 is joined to the metallic deposit 58 by any operable technique at the joint 62. The preferred approach is welding, most preferably electron beam welding, because the joint 62 is in or close to the hot zone of the combustion chamber. The adaptor ring 60 is joined to the injector by any operable technique at the joint 64. Because the joint 64 is at a lower temperature than the joint 62 during service, other types of joining techniques are operable. Welding by electron beam welding is preferred, as shown in FIGS. 2 and 3, or, for example, a flange/bolt structure may be used.

To complete the fabrication, the expansion nozzle 28 is attached to the combustion chamber 22, if the expansion nozzle 28 was prepared as a separate component from the combustion chamber 22. The propellant lines are connected, and any other elements of the rocket engine, such as instrumentation probes, are attached.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A rocket engine, comprising
  a combustion chamber comprising
    an annular wall with a wall inner surface and a wall outer surface, the annular wall having a wall length and being made of an annular wall material,
    an annular insert made of an annular insert material that is of substantially the same thermal expansion coefficient as the annular wall material, the annular insert having
      an insert outer surface sized to fit within and contact the wall inner surface in a faying relationship along less than the wall length, and
      an insert inner surface, and
    a first weld joint between the annular wall and the annular insert;
  an injector; and
  an attachment between the combustion chamber and the injector, the attachment comprising:
    an annular metallic deposit bonded to the combustion chamber,
    an annular adaptor ring,
    a second weld joint between the adaptor ring and the metallic deposit, and
    a third joint between the adaptor ring and the injector.

2. The rocket engine of claim 1, further including
  a coating on at least a portion of at least one of the wall inner surface and the insert inner surface.

3. The rocket engine of claim 2, wherein the coating comprises a material selected from the group consisting of iridium and a ceramic.

4. The rocket engine of claim 1, wherein the annular wall comprises rhenium.

5. The rocket engine of claim 4, wherein the annular insert comprises rhenium.

6. The rocket engine of claim 1, wherein the annular insert comprises a metal selected from the group consisting of unalloyed rhenium and an alloy of 50 weight percent rhenium, 50 weight percent molybdenum.

7. The rocket engine of claim 1, wherein the injector comprises titanium.

8. The rocket engine of claim 1, wherein the annular metallic deposit comprises columbium.

9. The rocket engine of claim 1, wherein the annular adaptor ring comprises columbium.

10. The rocket engine of claim 1, wherein the annular metallic deposit is bonded to the annular insert.

11. A method of fabricating a rocket engine, comprising the steps of
  fabricating a combustion chamber by the steps of
    providing an annular wall with a wall inner surface and a wall outer surface, the annular wall having a wall length and being made of an annular wall material,
    providing an annular insert made of an annular insert material that is of substantially the same thermal expansion coefficient as the annular wall material, the annular insert having an insert outer surface sized to fit within and contact the chamber wall inner surface along less than the entire wall length, and an insert inner surface, and
    welding a first weld joint between the annular wall and the annular insert;
  providing an injector; and
  attaching the combustion chamber and the injector by the steps of
    bonding an annular metallic deposit to the combustion chamber,
    providing an annular adaptor ring,
    welding a second weld joint between the adaptor ring and the metallic deposit, and
    forming a third joint between the adaptor ring and the injector.

12. The method of claim 11, wherein the step of fabricating a combustion chamber includes the step of
  fabricating the annular wall by a method selected from the group consisting of chemical vapor deposition, plasma spraying, explosive cladding, and sputtering.

13. The method of claim 11, wherein the step of fabricating a combustion chamber includes the step of
  fabricating the annular wall from rhenium.

14. The method of claim 11, wherein the step of fabricating a combustion chamber includes the step of
  applying a coating to at least a portion of at least one of the wall inner surface and the insert inner surface.

15. The method of claim 14, wherein the step of applying a coating includes the step of
  applying a coating selected from the group consisting of iridium and a ceramic.

16. The method of claim 11, wherein the step of bonding an annular metallic deposit includes the step of
  bonding the metallic deposit to the combustion chamber by a method selected from the group consisting of chemical vapor deposition, inertial welding, explosive cladding, and plasma spraying.

17. The method of claim 11, wherein the step of bonding an annular metallic deposit includes the step of
  providing a metallic deposit material comprising columbium.

* * * * *